United States Patent [19]

Solow

[11] Patent Number: 4,494,391

[45] Date of Patent: Jan. 22, 1985

[54] AUTOMOBILE SECURITY DEVICE FOR STEERING COLUMN IGNITION LOCKS

[75] Inventor: Joseph E. Solow, Plainview, N.Y.

[73] Assignee: Wolo Manufacturing Corporation, Deer Park, N.Y.

[21] Appl. No.: 524,850

[22] Filed: Aug. 19, 1983

Related U.S. Application Data

[63] Continuation of Ser. No. 236,878, Feb. 23, 1981, abandoned.

[51] Int. Cl.³ ............................................. E05B 17/14
[52] U.S. Cl. ........................................ 70/428; 70/18; 70/237
[58] Field of Search ............... 70/18, 15, 14, 49, 237, 70/252, 236, 178, 424, 428, 423, 30

[56] References Cited

U.S. PATENT DOCUMENTS

| | | |
|---|---|---|
| 539,650 | 5/1895 | Searle ........................................ 70/15 |
| 1,359,213 | 11/1920 | Welch . |
| 1,421,020 | 6/1922 | Miller . |
| 1,428,649 | 9/1922 | Miller . |
| 1,444,161 | 2/1923 | Arnold . |
| 1,681,409 | 8/1928 | Johnson ................................... 70/18 |
| 3,811,303 | 5/1974 | Robertson . |
| 3,888,096 | 6/1975 | Huss . |
| 4,008,589 | 2/1977 | Harrell ............................. 70/237 X |
| 4,019,354 | 4/1977 | O'Dell .................................. 70/236 |
| 4,020,662 | 5/1977 | Fowler . |
| 4,062,193 | 12/1977 | Deleto ................................... 70/18 |
| 4,074,550 | 2/1978 | Rowlings ............................. 70/237 |
| 4,123,924 | 11/1978 | Dworkis .............................. 70/237 |
| 4,282,730 | 8/1981 | Lipschutz ......................... 70/18 X |
| 4,304,111 | 12/1981 | Nolin ............................. 70/424 X |

Primary Examiner—Alexander Grosz
Assistant Examiner—Lloyd A. Gall
Attorney, Agent, or Firm—Brumbaugh, Graves, Donohue & Raymond

[57] ABSTRACT

An automobile security device for protecting an ignition lock mounted in an automobile steering column. The device includes a hollow cover to fit over the lock on the steering column, and a flexible tension-bearing element, preferably a link chain, for securing the cover to the column. The element is selectively engaged by a bolt mechanism linearly displaceable by a cam the cam in turn mounted on and rotatable with the rotatable element of a lock mounted in the cover.

9 Claims, 4 Drawing Figures

AUTOMOBILE SECURITY DEVICE FOR STEERING COLUMN IGNITION LOCKS

This application is a continuation of application Ser. No. 236,878, filed on Feb. 23, 1981 now abandoned.

BACKGROUND OF THE INVENTION

In a typical automobile, the ignition lock is mounted in the steering column below the steering wheel. Ignition locks are subject to defeat by the use of a master key, or by devices which pull the lock, such as a dent puller, to expose the ignition wires.

There is currently sold a steering lock cover which protects the ignition lock from access when the cover is in place. In this known device, an arcuate open collar and hollow cover fit together to form a 360° sleeve around the tubular steering column. The cover fits over and encases the ignition lock. The collar and cover pivotally inter-engage at one end, and are selectively secured together at their other end by a lock fixed in the cover. A tongue is fixed on the lock shaft, which is rotatable via a key to rotate the tongue into and out of engagement with a slot cut in the collar portion. The collar is sized for each particular application, i.e. size and shape of steering column, and includes cut-outs and slots, where appropriate, to accommodate turn signal levers and other switches fixed on the steering column. A variation of this device is shown in U.S. Pat. No. 4,020,662 to Fowler.

SUMMARY OF THE INVENTION

The present invention is an improvement in an automobile ignition lock cover, which is universal in application to any size or shape of steering column, and which includes a novel locking device for the cover.

More particularly, the present invention includes a hollow cover adapted to fit over the ignition lock and around a portion of the steering column, and a flexible element, preferably a link chain, fixed at one end to the cover. A cover lock mechanism is mounted in the cover, the rotating element, e.g. shaft, of which moves, through a cam arrangement, a bolt into and out of engagement selectively with the flexible element to secure the element in position relative to the other end of the cover. In the case of a link chain, the bolt includes one or more projections that selectively engage the chain between consecutive link pins.

For a better understanding of the invention, reference is made to the following detailed description of the preferred embodiment, taken in conjunction with the drawings accompanying the application.

DETAILED DESCRIPTION OF THE PREFERRED EMBODIMENT

Figure 1:
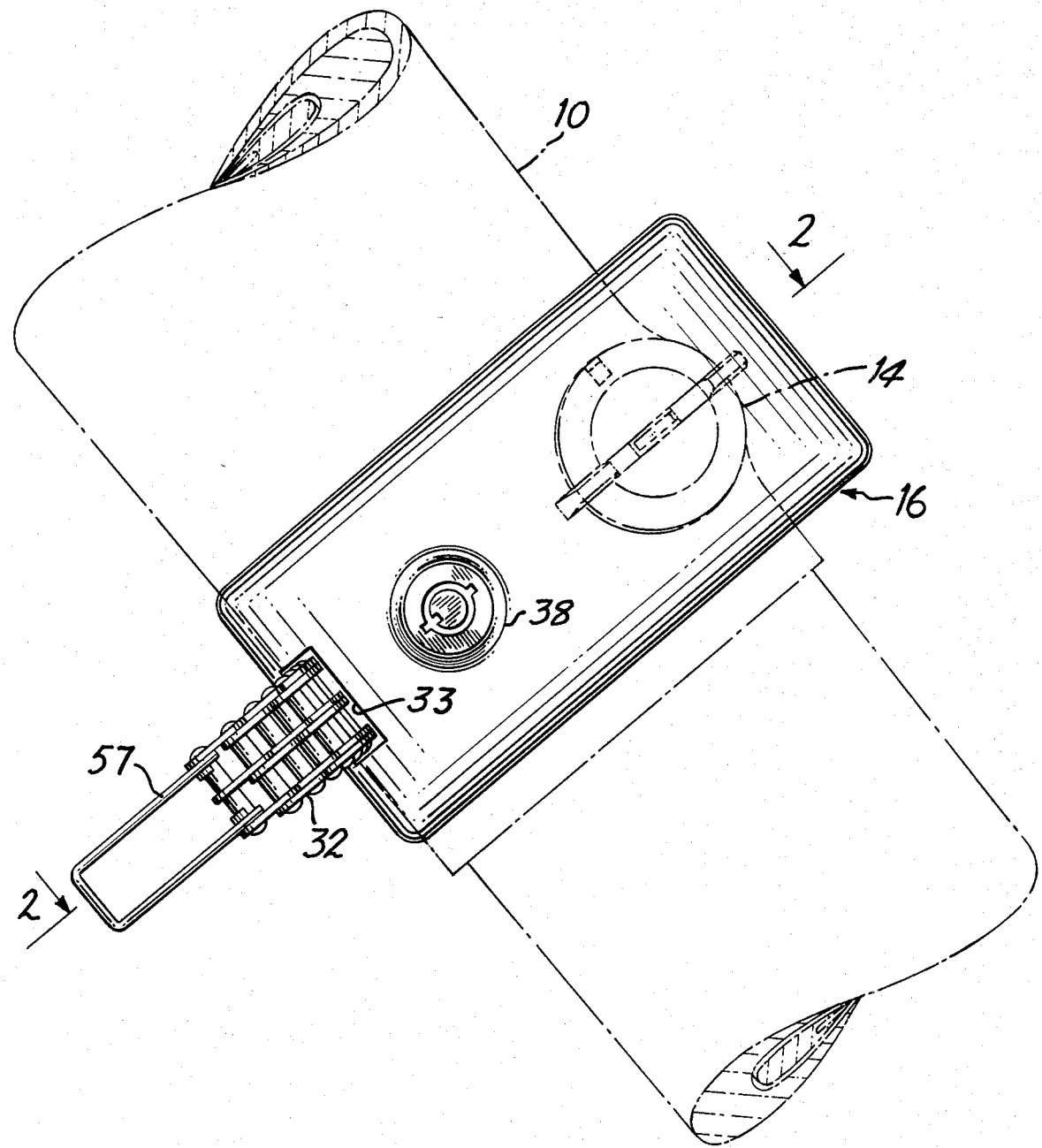
FIG. 1 is a side view of an ignition lock cover in accordance with the invention, shown positioned on an automobile steering column.

For purposes of illustrating the invention, a typical automobile steering column 10 is shown. The steering column 10 includes a boss 12, in which is positioned an ignition lock 14. In typical automobile applications, the ignition lock also locks the steering column.

The ignition lock cover 16 includes two pieces: a hollow cover 18 and a flexible tension-bearing element 20.

The cover 18 is formed with one side open, and a pair of opposed side walls 22, 24 that include arcuate edges 26 adapted to wrap around a portion of the outer cylindrical surface 28 of the steering column 10. An outer wall 27 is arranged perpendicular to the side walls 22, 24, at the edges away from edges 26. The cover 18 also includes opposed top 31 and bottom 30 walls arranged perpendicular to the outer wall 27 and to the side walls 22, 24.

Figure 2:
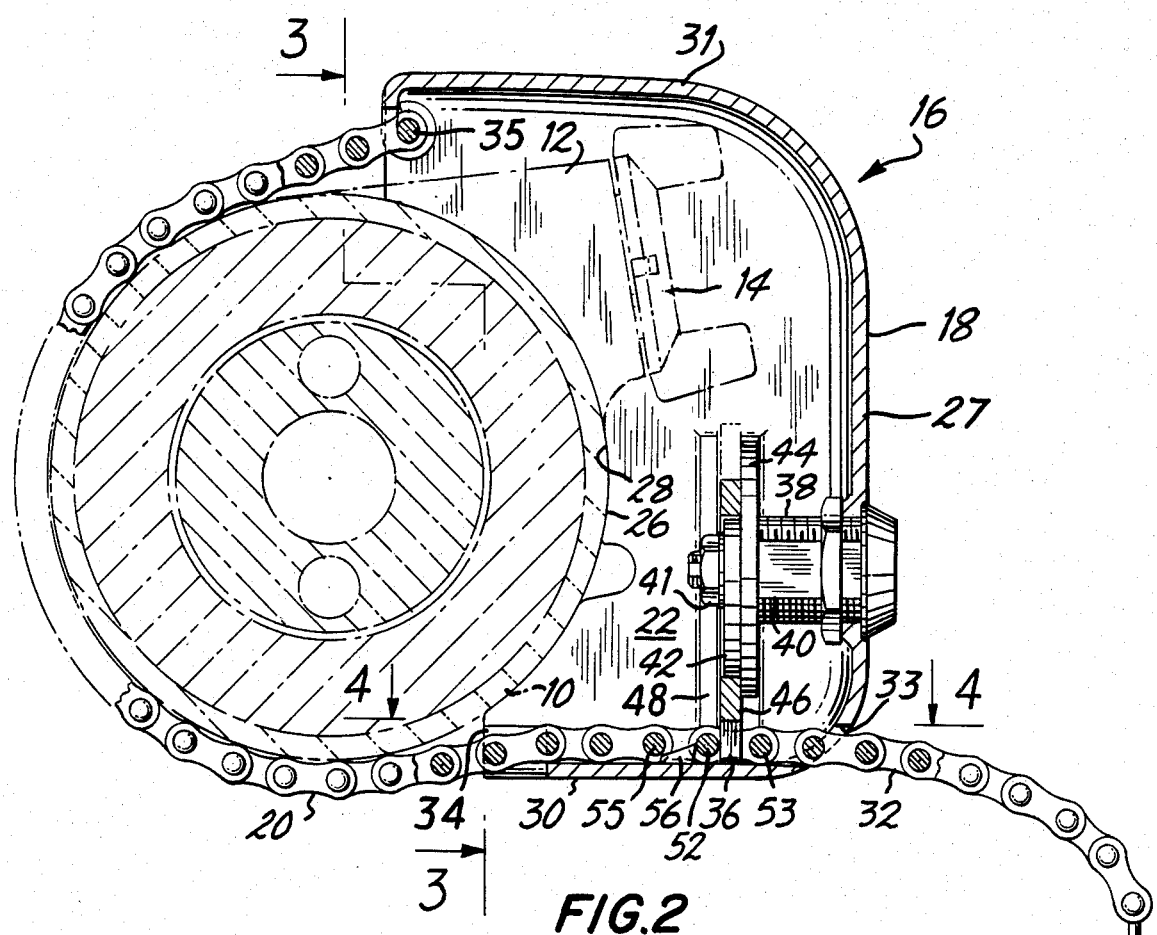
FIG. 2 is a cross-sectional view of an ignition lock cover in accordance with the invention, taken through lines 2—2 of FIG. 1.

The flexible tension-bearing element 20 is preferably a link chain such as a double strand link chain 32. The chain 32 is fixed at one end, by pivot pin 35, to the cover 18 at the upper wall 31. The arcuate section 26 is formed to space the lower wall 30 from the steering column 10 to define a first opening such that the chain 32 may be inserted into the housing 18 between the lower wall 30 and steering column 10. As shown in FIG. 2, the chain 32 is wrapped around the steering column 10, inserted into the housing portion 18 and locked therein to affix the ignition lock cover 16 to the steering column 10, as described more fully below.

Figure 3:
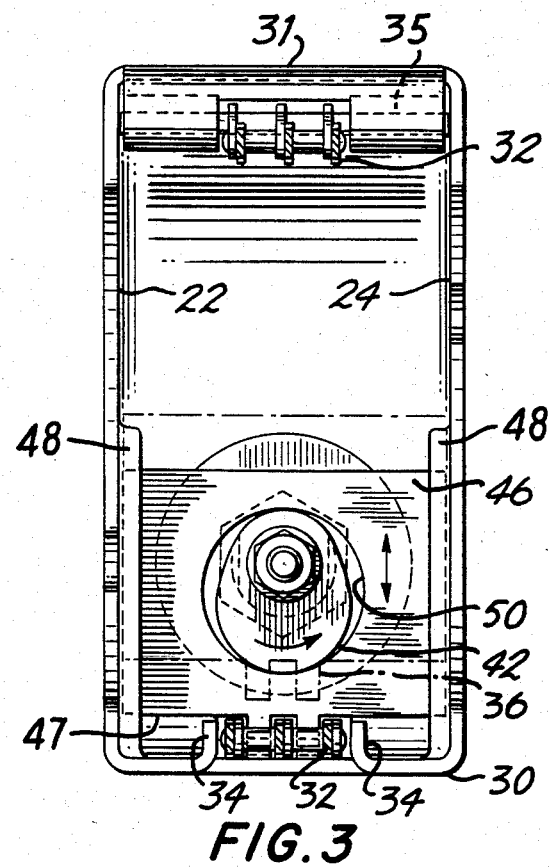
FIG. 3 is a cross-sectional view of an ignition lock cover in accordance with the invention, taken through lines 3—3 of FIG. 2.
Figure 4:
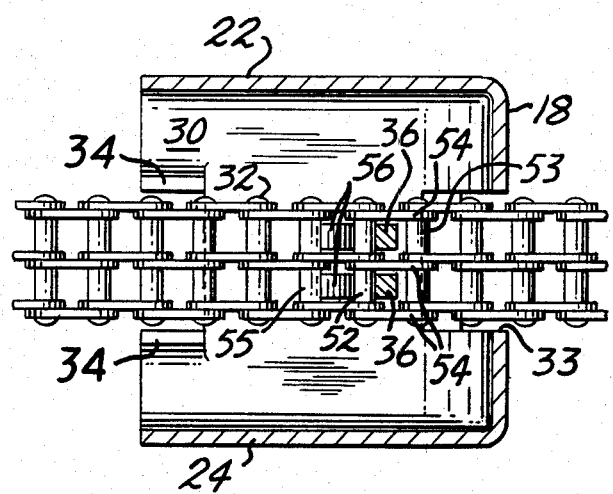
FIG. 4 is a cross-sectional view of a portion of an ignition lock cover in accordance with the invention, taken through lines 4—4 of FIG. 2.

As shown in FIGS. 3 and 4, the bottom wall 30 includes a pair of upturned guides 34 at the open end of the cover 18 to prevent the chain 32 from moving laterally. The bottom wall 30 and outside wall 27 also include a transverse slot 33 so that the chain 32, inserted through the cover 18, may thereafter be pulled taut out of the housing portion 18 through the slot 33.

When inserted into the lower portion of the cover 18, the chain 32 is selectively engaged by a pair of projections 36 on a bolt element 46 moveable up and down by the rotating shaft 40 of a lock 38. A cam 42 is fixed on the rotatable lock shaft 40 by a nut 41, and supported against a circular plate 44 also fixed to the rotatable shaft 40 of the lock 38. The bolt element 46, disposed within the housing cover portion 18, is rectangular in shape and displaceable longitudinally up and down along guides 48 on the side walls 22, 24. The guides 48 prevent rotation of the bolt element 46, and together with the circular plate 44 prevent any movement of the bolt element 46 parallel to the bottom wall 30. Optionally, a washer (not shown) may be positioned between the nut 41 and eccentric 42 to overlie the bolt element 46 to retain the bolt 46 in place.

The bolt element 46 includes an opening 50 therethrough which receives the cam 42. By turning the key in the lock 38, the shaft 40 and thereby the eccentric 42 rotates and displaces the bolt element 46 up or down. As the bolt element moves down, the projections 36 of the bolt element 46 extend through the chain 32 between adjacent link pins 52 and 53, and between links 54, to lock the chain 32 in place. For additional security, a pair of back stops 56 may be affixed to the bottom wall 30, which are positioned between the next adjacent pair of link pins 52 and 55. When the bolt element 46 is moved into the chain engaging position, the chain 32 is constrained by the bottom edge 47 (FIG. 3) of the bolt element 46 from moving up away from the bottom wall 30, and thus is held in engagement with the back stops 56.

When the lock shaft 40 is rotated in the opposite direction, the cam 42 moves the bolt element 46 up out of engagement with the chain 32. Once the projections 36 withdraw from the chain 32, the chain is constrained neither vertically nor longitudinally, and may be moved out of engagement with the stops 56 and removed freely from the cover 18.

In operation, when a vehicle is to be parked the cover 18 is fitted over the ignition lock 14 against the steering column 10. The chain 32 is wrapped around the steering column 10 and inserted into the cover 18 above the bottom wall 30, out through the back opening 33, and pulled taut. To facilitate insertion through the cover 18, a lead 57 made of metal or other relatively stiff material may be attached to the end link of the chain. The lock shaft 40 is rotated to move the bolt element 46 and projections 36 into engagement with the chain, and lock the chain in place. In this position, the ignition lock 14 is protected on all sides from access.

In view of the flexible tension-bearing element, e.g. chain 32, the ignition lock cover may be used on a variety of steering columns that differ not only in circumference but in shape. The use of the relatively small-width chain also facilitates attachment to the steering column around turn signal indicators, warning switches, etc. without requiring, as in the case of the device of U.S. Pat. No. 4,020,662, the separate provision of cut-outs or slots. Moreover, the linearly displaced bolt locking mechanism is particularly advantageous in preventing forceable removal of the lock cover. In the preferred embodiment, wherein a chain is used as the flexible element, the locking engagement occurs securely, with relative ease, and at any position in the chain. By providing the additional back stops in the bottom plate of the cover portion, additional locking strength is imparted. At the same time, the use of the back stops will not interfere with removal or insertion of the chain when the bolt mechanism is in the disengaged position.

The foregoing represents a description of the preferred embodiment of the invention. Variations and modifications will be apparent to persons skilled in the art. All such modifications and variations are intended to be within the scope of the invention as defined in the following claims.

I claim:

1. An automobile security device for protecting a steering column ignition lock comprising:

a cover having opposed ends, a top wall arranged at one end, a bottom wall arranged at the other end, opposed side walls, extending between said top and bottom walls, with arcuate edges adapted to wrap around a portion of the steering column, wherein said cover has a hollow interior adapted to fit over an ignition lock, wherein said bottom wall has an interior wall surface and is spaced from said arcuate edges to define a first opening for inserting a tension-bearing element into said interior to extend longitudinally along said surface, and wherein said cover has a second opening longitudinally spaced from said first opening for passing the tension-bearing element therethrough, out from said interior;

an elongate, flexible tension-bearing element attached to said one end, wherein said element has a plurality of recesses spaced along its length and has a free end adapted to be inserted into said first opening, to extend along said interior wall surface, and to extend out through said second opening;

back stop means fixed on said wall surface and arranged for selectively engaging at least one of said recesses for preventing longitudinal movement of said element; and a cover lock mechanism comprising: (a) a lock mounted to a portion of said cover spaced from said bottom wall, (b) bolt means actuatable by said lock comprising a bolt movable toward and away from said bottom wall between an engaged position, for locking said back stop means in engagement with a recess of said element, and a disengaged position, for permitting said tension-bearing element and said back stop means to disengage, wherein in said disengaged position said tension-bearing element may be moved freely in its longitudinal direction and inserted or removed from the interior of said cover; and wherein said bolt further includes at least one projection for selectively engaging a recess of said tension-bearing element when said bolt is moved to said engaged position.

2. A security device as defined in claim 1, wherein said cover lock mechanism comprises a rotatable lock element, and means coupled between said lock element and said bolt means for moving said bolt means longitudinally toward said flexible element into said engaged position or away from said flexible element into said disengaged position in response to rotation of said lock element.

3. A security device as defined in claim 2, wherein the means for moving said bolt means comprises eccentric means coupled to said lock element.

4. A security device as defined in claim 2, and comprising guide means supported by said cover for permitting movement of said bolt means perpendicular to said wall surface and for restraining movement of said bolt means parallel to said wall surface.

5. A security device as defined in claim 4, wherein said bottom wall has guide means disposed in said interior for constraining movement of said flexible element in a direction transverse to its length.

6. A security device as defined in claim 5, wherein said flexible element comprises a link chain, said chain having transverse link pins connected by links, wherein said first and second openings are sized to receive said chain, and wherein the guide means for constraining movement of said flexible element is in the form of a pair of upturned guide portions on said bottom wall adjacent said first opening.

7. A security device as defined in claim 6, wherein said chain has a lead of relatively stiff material to facilitate inserting said chain into said interior and through said second opening.

8. A security device as defined in claim 4, wherein said flexible element comprises a link chain.

9. A security device as defined in claim 1, wherein said flexible element comprises a link chain.

* * * * *